United States Patent

[11] 3,571,520

[72] Inventors James W. Clarke, Jr
Plantation;
William P. Parmer, Fort Lauderdale, Fla.
[21] Appl. No. 838,144
[22] Filed July 1, 1969
[45] Patented Mar. 16, 1971
[73] Assignees Data Research Corporation
Fractional interest to each;
Computer Utilities Corporation
Fort Lauderdale, Fla., Fractional interest to each

[54] COMMUNICATION SWITCHING UNIT
12 Claims, 3 Drawing Figs.

[52] U.S. Cl. .................... 179/42, 179/99
[51] Int. Cl. .................... H04m 5/08
[50] Field of Search .................... 179/2 (C), 99, 169, 42

[56] References Cited

UNITED STATES PATENTS

| | | | |
|---|---|---|---|
| 2,515,883 | 7/1950 | Meade | 179/42x |
| 2,700,070 | 1/1955 | Vincent | 179/42x |
| 3,057,963 | 10/1962 | Gray | 179/42 |

*Primary Examiner*—Ralph D. Blakeslee
*Attorneys*—William D. Hall, Elliott I. Pollock, Fred C. Philpitt, George Vande Sande, Charles F. Steininger and Robert R. Priddy

ABSTRACT: A multiposition switching unit located adjacent a telephone set includes means for connecting an incoming telephone call on any line with a remotely located telephone contacted on any other line without using a patch panel or similar device.

INVENTORS
James W. Clarke, Jr.
William P. Parmer

BY

ATTORNEY

Patented March 16, 1971 3,571,520

2 Sheets-Sheet 2

INVENTORS
James W. Clarke, Jr.
William P. Parmer

BY [signature]

ATTORNEY

COMMUNICATION SWITCHING UNIT

BACKGROUND OF THE INVENTION

Many business offices, industrial plants and the like are provided with telephone systems incorporating a relatively large, central switchboard and an attending operator who receives incoming calls and then, by use of a patch panel or similar device, connects the incoming call to a desired party being called. Equipment of this type is bulky, expensive, and ordinarily requires a trained operator. As a result, such equipment is practical for use only in relatively complex telephone systems servicing a large number of telephone lines.

Business offices having a plurality of incoming lines, but incorporating a telephone system which does not justify a central switchboard, can accomplish switching functions of the types described to a lesser degree through use of a so-called "call director". Systems of this type are designed to route an incoming call to any one of a plurality of telephones within the business office itself, and do not include provision for transferring a call to some other telephone located away from the business premises. As a result, if a party being called is away from his office, it is impossible for the operator to transfer an incoming call to such a party; and the operator must merely note that the party was called so that the party in question can return the call at a later appropriate time.

It is far preferable if an operator, receiving a call from a calling telephone, can connect the calling telephone with a remotely located telephone so that the call can be completed immediately. In achieving this type of operation, moreover, it is important that the mechanism employed for transferring an incoming call to such a remotely located telephone be relatively small, inexpensive, reliable and maintenance-free in operation, and that it be capable of operation by relatively unskilled persons without the need for special training. Moreover, any system to be employed for the purposes described should be so arranged that it is relatively foolproof in operation to assure that telephone lines are automatically returned to their normal operating condition after a transferred call has been completed; and, moreover, should be so arranged that the telephone signals are not deteriorated or excessively attenuated as a result of the call transfer operation.

The present operation, recognizing the limitations in central switchboard systems, is concerned with a unique, compact switching arrangement capable of achieving such call transfer operations inexpensively, reliably, and in a foolproof manner by relatively unskilled persons, and without requiring any rewiring or modification of an existing telephone system or impairment of an existing system due to addition of the call transfer capability.

SUMMARY OF THE INVENTION

A small, desk-top switching unit has separable terminals adapted to be connected in parallel with a plurality of telephone lines at the conventional plug connector feeding a standard five-line office telephone set. The switching unit is light in weight, compact, and can be inconspicuously placed on a standard desk adjacent a telephone set for use by a secretary, receptionist, or other operator. The unit includes a multiple position switch arranged to selectively interconnect any one of the five telephone lines, associated with a given telephone set, with any selected other one of said five lines; and includes further switching means for effecting a call transfer operation between the two selected lines when the operator is assured that both parties are on their respective lines.

The operator, upon receiving a telephone call on a given line, may place that incoming call on "hold" dial or otherwise contact a desired party on another line; and then, by use of the switching unit, can immediately connect the caller with the desired party without the need for a patch panel or similar device. The switching unit includes means for inhibiting the "hold" operation when the call is transferred, amplifier means compensating for any signal loss caused by the transfer operation, and means for automatically returning the telephone lines to their normal condition upon completion of the call.

DESCRIPTION OF THE PREFERRED EMBODIMENT

Figure 1:
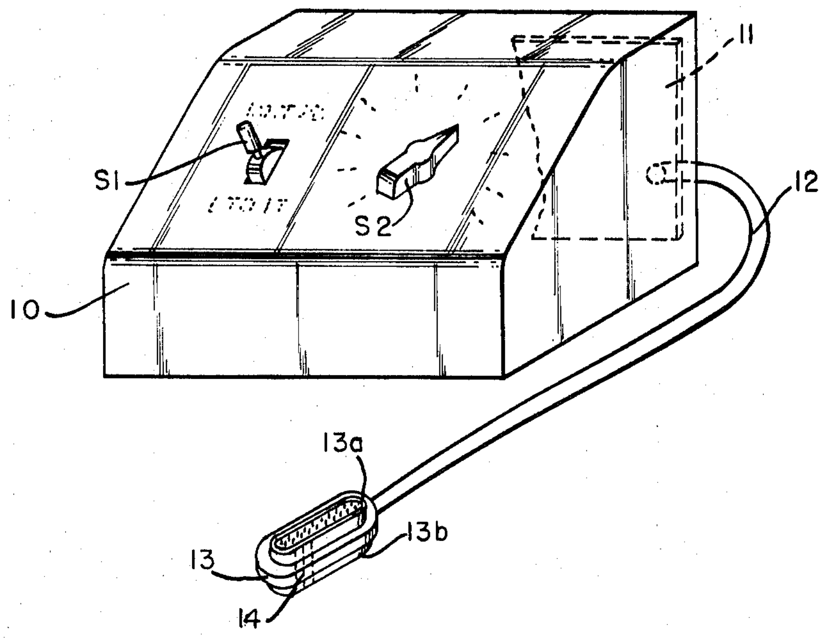
FIG. 1 is an illustrative view of a communication switching unit constructed in accordance with the present invention
Figure 2:
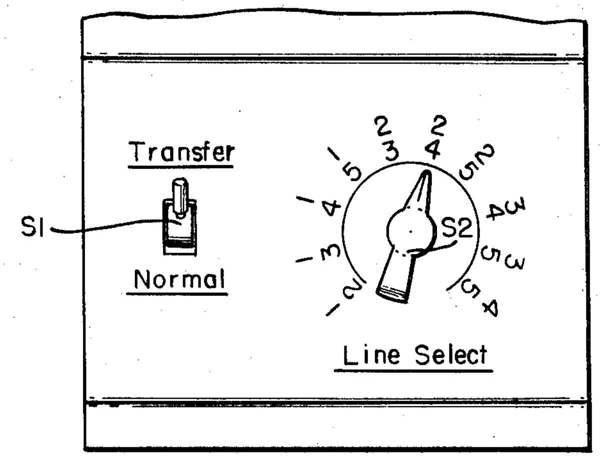
FIG. 2 is a detail view of the control panel of the switching unit shown in FIG. 1.

Referring initially to FIGS. 1 and 2, it will be seen that a communication switching unit constructed in accordance with the present invention may comprise a relatively small, lightweight, housed unit 10 adapted to be mounted on a desk adjacent to a five-line office telephone. It should be noted, in this respect, that the present invention is not limited to use with a five-line system, and can be reduced to two telephone pairs or expanded to handle any number of telephone line pairs; but inasmuch as a five-line system is the most common system in present use, the subsequent description is specifically directed to such a system.

Figure 3:
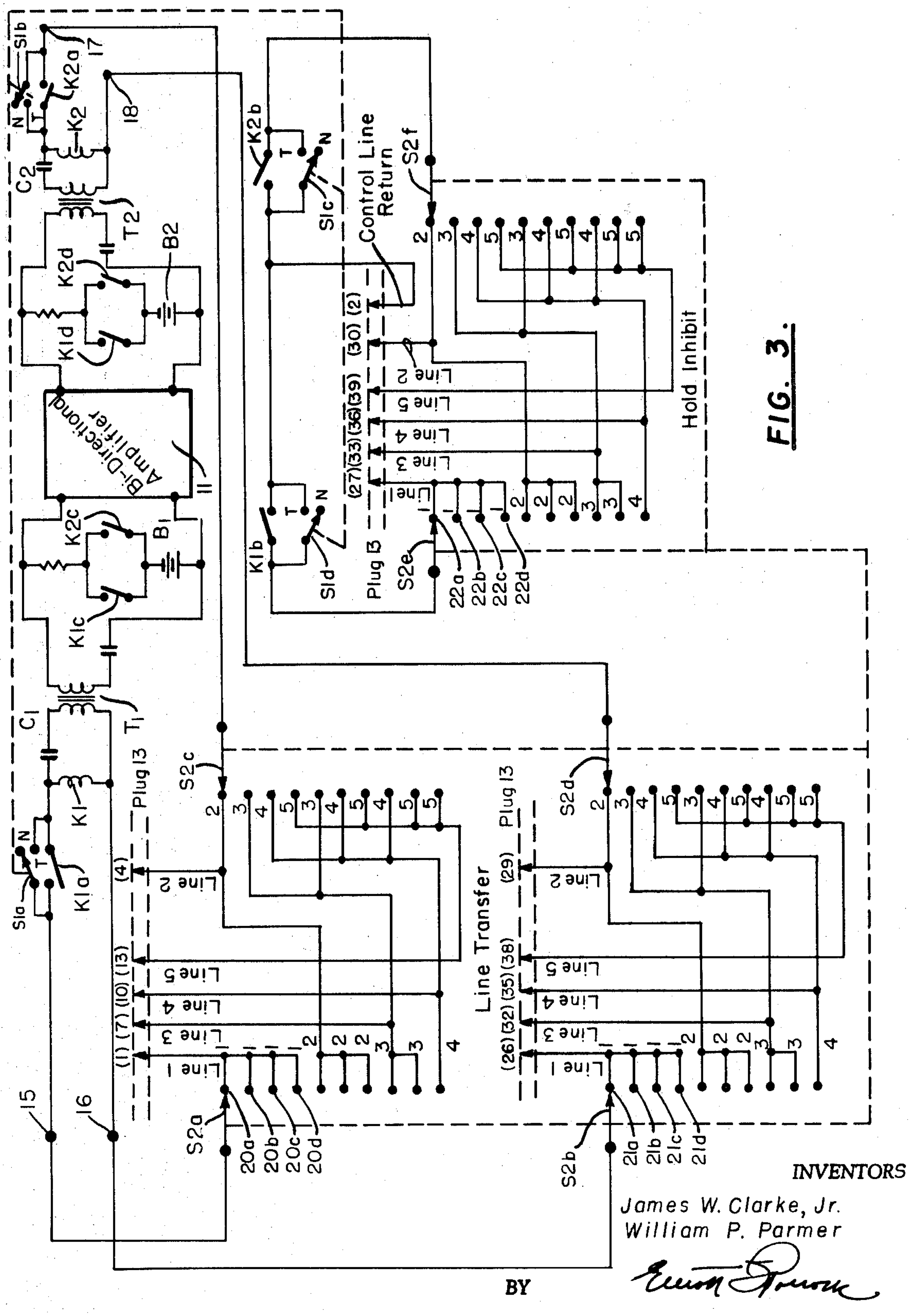
FIG. 3 is a schematic diagram of a communication switching unit embodied in the device of FIG. 1.

Communication switching unit 10 includes a manually operable switch $S_1$ of the toggle type selectively transferable between two positions designated "normal" (or N" ) and "transfer" (or T); and switch $S_1$ operates a plurality of switch contacts $S_{1a}$ -$S_{1d}$ inclusive which are ganged to one another and interconnected to the remainder of the circuit in the manner to be described in reference to FIG. 3. The purpose of switch $S_1$ and its several contacts will become apparent from the subsequent description.

Unit 10 also includes a rotary switch $S_2$ adapted for movement to any of 10 different positions shown in FIGS. 2 and 3. Switch $S_2$, when rotated, moves a plurality of ganged movable switch contacts $S_{2a}$ through $S_{2f}$ inclusive (FIG. 3). Each of these movable contacts is associated with a separate plurality of ten fixed contacts (FIG. 3) which are interconnected to one another and to the various telephone lines coming into the telephone set in the manner to be described subsequently. For convenience the five telephone lines have been designated "line 1" through "line 5" inclusive, and switch $S_2$ is arranged to select different combinations of these lines for voice communication with one another. As shown in FIG. 2, therefore, a first position of switch $S_2$ is adapted to select lines 1 and 2 for interconnection, the next position of switch $S_2$ is adapted to select lines 1 and 3 for communication, etc.

In addition to containing the switching unit described above, the unit 10 includes a bidirectional amplifier 11 mounted on a printed circuit board and interconnected to the switching elements and telephone lines in the manner to be described subsequently in reference to FIG. 3. Connection to the telephone lines is achieved by a cable 12 terminating in a plug 13 having male and female portions 13*a*, 13*b* which are wired straight through as at 14, and which include further connections leading to conductors in cable 12 and connected in parallel with the straight-through connectors.

The connector pin assignment and signal designation for a five-line telephone system are standard throughout the country. These five lines come into a business office on a single 25-pairs line that has a standard color code for each pair, and is terminated in an Amphenol Series 57 fifty-pin miniature connecture. The normal five-line telephone set plugs into this fifty-pin connector. When the communication switching unit shown in FIG. 1 is to be employed, it is plugged into the preexisting fifty-pin connector by means of plug 13, with plug elements 13*b* and 13*a* being disposed between the complementary male and female portions of the standard connector adjacent the telephone set itself. All 25 pairs of the incoming line are wired straight through plug 13, as at 14, so that normal telephone communication can be maintained; and the 16 wires (to be described), associated with the five lines of the telephone and the "hold" control line return, are connected in parallel via cable 12 with the straight-through wiring. Since the telephone system wiring is standard throughout the country, the switch elements associated with $S_2$ can always be wired to plug 13 in the same way; and the conventional pin designations normally employed in standard five-line telephone systems have been identified in the circuit of FIG. 3 by numerals in parentheses to correlate the wiring in plug 13 with the conventional connector pin assignment employed in existing telephone systems.

Referring now to FIG. 3, it will be seen that bidirectional amplifier 11 includes a pair of input/output circuits located respectively between terminals 15, 16 and terminals 17—18. Switch $S_2$ is provided to connect a selected different pair of lines to these two input/output circuits in dependence upon the particular position of the various movable switch blades $S_{2a}$—$S_{2d}$. Switch $S_1$ operates, inter alia, to complete the circuits between the selected lines and the input/output circuits of amplifier 11 when it is desired to achieve actual voice communication between the two selected lines.

Bidirectional amplifier 11 operates to add gain to both selected lines to make up for signal losses due to the increase in central office-to-central office line length resulting from the line transfer operation effected by the unit of the present invention. In a normal telephone system, the maximum signal loss from any station in the system to a central office is always 10db. or less; and if two pairs of lines at a station that has 10db. loss to the central office were connected together without amplification, the conferees would be subjected to a signal that is 10db.'s lower than they would normally encounter. Amplifier 11 overcomes any such line losses due to the switching function to be described, and bring the signal level back to normal. The bidirectional amplifier 11 preferably has a gain in both its forward and reverse directions that is adjustable from 0db. to 18db., and the gain in both directions of amplification is preferrably adjusted by a single gain control which can take the form of a manual screw adjustment located on the underside of unit 10. The amplifier itself may take various configurations well known in the art; and one possible such configuration is shown in Fingerle U.S. Pats. Nos. 3,177,302 and 3,177,303 . The gain can be readily set to a desired level simply by turning up the common gain control until the operator hears "singing" in the amplifier, whereafter the gain control is backed off slightly. This gain adjustment can be made at the time the unit is initially installed, and need not thereafter be changed.

Input-output circuit 15, 16 of the amplifier 11 includes a transformer $T_1$ operative to transfer voice signals in both directions relative to amplifier 11. The coil of a relay $K_1$ is connected across the primary of transformer $T_1$, and is DC isolated from said transformer primary by a capacitor $C_1$. The DC circuit to relay coil $K_1$ is selectively completed by switch blade $S_{1a}$ which is manually transferrable in the manner described previously between the N (normal) and T (transfer) positions; and switch blade $S_{1a}$ is bridged by a relay contact $K_{1a}$ which is normally open, but which is closed upon energization of relay $K_1$. Operation of switch blade $S_{1a}$ (or relay contact $K_{1a}$) completes a circuit to relay coil $K_1$ so as to permit DC current to flow through the relay coil and, at the same time, permits voice signals to be transferred via capacitor $C_1$ and transformer $T_1$ to and from bidirectional amplifier 11.

The other input/output circuit 17, 18 of the amplifier 11 is entirely similar to the one just described, and includes a transformer $T_2$, a capacitor $C_2$, relay coil $K_2$, and parallel connected switch and relay contacts $S_{1b}$ and $K_{2a}$. The interaction of all of these various elements in the input/output circuits of amplifier 11 will become apparent from the subsequent description.

The five telephone lines normally associated with the telephone set are connected at plug 13 and via cable 12 with fixed switch contacts comprising portions of switch $S_2$. These five lines comprise five line signal pairs each of which is further associated with a "hold" circuit control line. By way of example, referring to the line designated "line 1", it will be seen that one of the line signal pairs is connected to plug pin (1 ) and thence to four interconnected fixed terminals **20*a*—20*d* inclusive in the portion of switch $S_2$ associated with movable blade $S_{2a}$. The other line signal pair associated with line 1 is connected from plug pin (26) to four interconnected fixed contacts 21*a*—21*d* inclusive associated with movable switch blade $S_{2b}$ of switch $S_2$. Line 1 further includes a "hold" circuit control line which is connected from plug pin (27) to four interconnected fixed contacts 22*a*—22*d*** associated with movable switch blade $S_{2e}$ in switch $S_2$.

The three line portions associated with each of lines 2 through 5 is similarly interconnected to fixed contacts in switch $S_2$; and the actual interconnections between these various lines and the fixed switch contacts will be apparent from examination of FIG. 3. In order to facilitate review of this interconnection, various numerals 1 through 5 inclusive have been placed adjacent the fixed contacts of switch $S_2$ to identify the telephone line with which each such fixed contact is associated. It will be noted that in each case, each line portion is connected to four fixed switch contacts; but the actual disposition of these switch contacts relative to one another and relative to the movable switch contacts $S_{2a}$—$S_{2f}$ differs from one to the next line. As will be apparent, the pluralities of fixed contacts in switch $S_2$ are so interconnected to one another and so positioned relative to one another and relative to the different possible positions of the ganged movable contacts $S_{2a}$-—$S_{2f}$ that each position of the ganged movable contacts selects a different combination of the five lines for connection to the input/output circuits 15, 16 and 17, 18 of amplifier 11.

The portions of switch $S_2$ associated with switch blades $S_{2a}$-—$S_{2d}$ inclusive comprise the "line transfer" portion of the switching arrangement, and operate to couple a different pair of telephone lines to the respective input/output circuits of amplifier 11. A further section of the switching arrangement associated with movable switch blades $S_{2e}$ and $S_{2f}$ constitutes a "hold inhibit" portion of the circuit, and is associated with the various hold control lines connected to plug pins (27), (33), (36), (39), and (30), as illustrated. In the standard operation of a telephone system of the type here involved, when a particular telephone system of the type here involved, when a particular telephone line is placed on "hold," a voltage is applied to its associated control line which operates to pull in a relay in the telephone system which functions to place a dummy load across the signal pair associated with the selected telephone line so as to keep that line open when the hand set is not being used as a load. By way of example, if "line 1" is placed on "hold" during normal operation of the telephone system, a voltage is applied to pin (27) by the telephone system so as to place a dummy load across the line 1 signal pair connected respectively to plug pins (1) and (26). Analogous operation takes place with respect to each of the other line signal pairs, each of which pairs has its own hold control line.

The dummy load so placed across the line signal pair is removed by placing the hand set, or an equivalent load, across the selected signal pair so as to short the control line associated with that pair to a control line return. In the case of line 1, for example, when the "hold" operation is to be inhibited, line 1 pin (27) is shorted to control line return pin (2). an analogous hold inhibit operation takes place with respect to each of the other control lines associated with the line signal pairs, by shorting selected ones of said control lines to control line return pin (2). This "hold" and "hold inhibit" operation provided in conventional multiple line telephone sets is in no way interrupted by the switching arrangement of the present invention, but is incorporated into the switching function achieved by the unit of the present invention.

Ganged movable switch blades $S_{2a}$ and $S_{2b}$ are connected respectively to opposite sides 15 and 16 of one of the bidirectional amplifier input/output circuits. Ganged movable switch blades $S_{2c}$ and $S_{2d}$ are similarly connected to the opposite sides 17, 18 of the other amplifier input/output circuit. These several movable switch contact blades are so positioned relative to one another and relative to the fixed contacts of switch $S_2$ that, as switch $S_2$ is moved from one to the next of its possible positions, the signal pairs of different telephone lines are interconnected to one another via the two amplifier input/output circuits. In the position of the switch blades shown in FIG. 3, lines 1 and 2 are selected for coupling to one another, via amplifier 11. More particularly, one of the line 1 signal pairs is coupled from plug terminal (1) to fixed contact 20a, switch blade $S_{2a}$, terminal 15, through relay coil $K_1$ (disregarding for the moment the operation of switch $S_{1a}$ and relay contact $K_{1a}$), to terminal 16, switch blade $S_{2b}$, and line 1 plug pin (26) associated with the other one of the line 1 signal pairs. A similar circuit may be traced between plug pin (4), movable switch blade $S_{2c}$, input/output circuit 17, 18, switch blade $S_{2d}$, and plug pin (29) for the line 2 signal pairs.

At the same time, for the switch positions shown, the line 1 hold control line is connected from plug pin (27) via switch blade $S_{2e}$ to control line return pin (2) (disregarding for the moment the operation of the switch blade $S_{1d}$ and relay contact $K_{1b}$), and a similar connection can be traced from the hold control line for line 2, from plug pin (30), switch blade $S_{2f}$, and switch and relay contacts $S_{1c}$ and $K_{2b}$ to control line return pin (2). The particular switch blade positions shown in the drawing (disregarding for the moment the operation of switch $S_1$) thus couple telephone lines 1 and 2 to the two input/output circuits of amplifier 11 and, at the same time, inhibit any hold operation which may have been imposed on either of these two lines.

An analogous connection is achieved for other pairs of the telephone lines for different successive positions of switch $S_2$. Thus, for the position of switch blades $S_{2a}$—$S_{2f}$ next subsequent to that shown in FIG. 3, telephone lines 1 and 3 are coupled to amplifier 11; the next following position couples lines 1 and 4; and subsequent switch position couple in sequence lines 1 and 5, lines 2 and 3, lines 2 and 4, lines 2 and 5, lines 3 and 4, lines 3 and 5, and lines 4 and 5. At the same time, for each possible switch position, the hold control lines associated with the selected pair of telephone lines are selected for return to the control line return pin (2) at the telephone connector to permit inhibition of any hold operation which may have been instituted earlier by the telephone operator.

Before describing the circuit operation in detail, a general description of the unit and its use will be given so that the detailed description will be more readily understood. Let us assume that an incoming call causes the office telephone set to ring, and that the call is incoming on line 1. The operator answers the telephone on line 1 and finds that the calling party wishes to speak with someone who is away from the office but can be reached at another telephone located elsewhere in the overall telephone system. The operator, having received the incoming call on line 1, then depresses the "hold" button on the telephone set so as to place line 1 on hold. Let us assume further that the operator finds that line 2 is not in use. The operator depresses the line select button associated with the line 2 on the telephone set so as to select line 2 for an outgoing telephone call. She then dials or otherwise contacts the desired party on line 2 while line 1 remains on hold. When the called party answers on line 2, the operator rotates switch $S_2$ until it is in position to select lines 1 and 2 for interconnection. The operator then moves switch $S_1$ from its "normal" to its "-transfer" position. This manipulation of switch $S_1$ completes the interconnection between lines 1 and 2 via amplifier 11, simultaneously inhibits the hold operation which she had previously placed on line 1, and so energizes relays $K_1$ and $K_2$ as to hold the resultant circuits in their completed states so long as line current is flowing in the selected telephone lines.

For the sequence of operations described, the parties on lines 1 and 2 are now able to speak directly to one another. Moreover, so long as the operator's switch remains in the "-transfer" position, the operator is able to participate in the conversation with the other two parties so as to achieve a three-party conference call. The operator, upon being assured that the parties are speaking to one another on the two selected lines, may however return the switch $S_1$ immediately to its "normal" position without interrupting the previously completed circuit between lines 1 and 2. This return of switch $S_1$ to its "normal" position assures that as soon as one of the parties hangs up his phone, the line current in that line is interrupted so as to cause the relay associated with that line (either $K_1$ or $K_2$) to open and return that line to its normal condition. As would be apparent to those skilled in the art, this is a highly desirable feature since it provides an automatic shutoff operation; and in the absence of this feature, a line could be inadvertently left open over night or even over a weekend so that an extremely large long-distance telephone charge could be run up even though the call in question was long since completed.

In a manner similar to that described above, the unit may also be used to initiate a conference call. In this type of operation, the person in charge of the communication switching unit can call one party on any given line, place that party on hold, call another desired party on any other line, select the proper two lines for interconnection at switch $S_2$, and then transfer switch $S_1$ to complete a conference circuit between the initiating telephone and telephones on the two selected lines. All three parties can be located anywhere in the telephone system and still will be able to carry on a normal conversation. When the telephone call is completed, the unit will return the telephone lines to their normal conditions automatically, provided of course transfer switch $S_1$ has been returned to its "normal" position.

Examining now the operation of the FIG. 3 circuit in detail, let us again assume that the incoming call is received on line 1. In accordance with the procedure outlined previously, the operator places line 1 on "hold," making normal use of the circuits already present in the office telephone system which are in no way disturbed by the parallel connected communication switching unit of the present invention. The operator then contacts the desired party on a different line of the telephone set which. for purposes of illustration, has been assumed to be line 2. When the desired party answers on line 2, the operator then rotates switch $S_2$ until the desired two lines to be used for the conversation have been selected.

For the example described, switch $S_2$ would be rotated to the "1—2" position (see FIG. 2), which corresponds to the position of movable switch blades $S_{2a}$—$S_{2f}$ shown in FIG. 3. This operation of switch $S_2$ functions to connect the line 1 pairs from plug pins (1) and (26) respectively to terminals 15, 16 of the amplifier input/output circuit, and also functions to connect the line 2 signal pairs from plug pins (4) and (29) to terminals 17, 18 of the other bidirectional amplifier input/output circuit. No circuit is actually completed between these signal pairs at this point, however, inasmuch as switch $S_1$ is in its "normal" position, whereby all of the switch blades $S_{1a}$—$S_{1d}$ inclusive are in their N or open position. For similar reasons, no circuit is yet completed between the hold control line associated with line 1, from plug pin (27) to the control line return pin (2), since switch blade $S_{1d}$ is still open.

Having selected the two lines in the manner described, the operator then moves switch $S_1$ from its "normal" to its "transfer" position so as to move each of switch blades $S_{1a}$—$S_{1d}$ inclusive to their "T" or closed position. This operates to interconnect the line 1 signal pairs to one another across relay coil $K_1$, operates to interconnect the line 2 signal pairs to one another across relay coil $K_2$, latches the selected lines into circuit continuity with the amplifier input/output circuits, and simultaneously cancels the "hold" operation on line 1.

More particularly, closure of switch $S_1$ completes a circuit from plug pin (1) via movable switch blade $S_{2a}$ to terminal 15, and thence through switch blade $S_{1a}$, relay coil $K_1$, terminal 16, switch blade $S_{2b}$, and the other line 1 signal pair to plug pin (26). Line 1 current accordingly flows through relay coil $K_1$ causing it to transfer its ganged relay contacts $K_{1a}$ through $K_{1d}$ inclusive to their closed positions. The function played by these various relay contacts will be described, but it will immediately appear that closure of contact set $K_{1a}$ completes a holding circuit across switch blade $S_{1a}$ to keep relay coil $K_1$ energized, and to maintain the line 1 signal pair connected to amplifier input/output circuit 15, 16 so long as line current continues to flow in line 1, and even though switch $S_1$ should be returned to its "normal" position so as to open contact $S_{1a}$.

An entirely similar switching operation is accomplished with respect to the line 2 signal pairs, i.e., closure of switch $S_1$ causes line 2 current to flow through relay coil $K_2$, causing its ganged contacts $K_{2a}$—$K_{2d}$ inclusive to close, and operating inter alia to latch the line 2 circuit to the other amplifier input/output circuit 17, 18 so long as line 2 current flows, and even though switch contact $S_{1b}$ should subsequently be opened.

Closure of switch $S_1$ also closes contacts $S_{1c}$ and $S_{1d}$ so as to complete circuits between the hold control lines associated with telephone lines 1 and 2 to the control line return pin (2). This releases the hold circuit on the line or lines which had previously been placed in their "hold" condition by the telephone operator; and energization of relay coils $K_1$ and $K_2$ operates to close relay contacts $K_{1b}$ and $K_{2b}$ which maintain the hold inhibit operation even through switch $S_1$ should be returned to its "normal" position.

Completion of the DC paths through relay coils $K_1$ and $K_2$ thus effectively connects lines 1 and 2 to the two amplifier input/output circuits and, at the same time, completes AC or voice paths to the bidirectional amplifier via capacitors $C_1$ and $C_2$ and transformers $T_1$ and $T_2$. These voice or AC connections hold after $S_1$ is opened due to a latching arrangement of the contacts $K_{1a}$ and $K_{2a}$ so that normal conversation can be carried on between the parties on lines 1 and 2, with any gain loss due to the increased line length being fully compensated by the voice signal amplification achieved by amplifier 11. This condition will persist so long as the telephones connected to lines 1 and 2 are in use; and as each such telephone is hung up, the line current in its associated line will terminate so as to automatically drop out relays $K_1$ and $K_2$ and return the telephone lines automatically to their normal operating condition.

Bidirectional amplifier 11 is preferably battery energized, with the batteries being contained within unit 10. The batteries are illustrated in FIG. 3 and $B_1$ and $B_2$ associated respectively with the two amplifier sections of the bidirectional amplifier. In order to minimize drain on the batteries $B_1$ and $B_2$, the batteries are preferably connected to amplifier 11 via normally open relay contacts which are closed only in response to energization of relays $K_1$ and $K_2$, thereby to assure that both batteries are connected into the amplifier circuit when needed, but are otherwise disconnected from the amplifier circuit. Battery $B_1$ is connected to the circuit of amplifier 11 via a parallel set of contacts $K_{1c}$ and/or $K_{2c}$ which are closed respectively by energization of relay coils $K_1$ and/or $K_2$; and, similarly, battery $B_2$ is connected to the amplifier circuit by parallel connected contacts $K_{1d}$ and/or $K_{2d}$ which are closed only in response to energization of relay coils $K_1$ and/or $K_2$. Battery sources $B_1$ and $B_2$ are thus connected to the amplifier only in response to line current flow through relay coils $K_1$ and $K_2$, upon closure of switch $S_1$. It should be noted that if switch $S_1$ is moved to its "transfer" position inadvertently, e.g., during shipment, relay coils $K_1$ and $K_2$ still cannot be energized since no line current is present; and therefore the batteries are in no way dissipated by such inadvertent movement of switch $S_1$ to its closed position.

We claim:

1. A communication switching unit for use in a telephone set having a plurality of lines wherein each of said lines comprises a pair of audio line portions normally disconnected from one another, a "hold" control line portion associated with each of said pairs of audio line portions, and a return line normally disconnected from said "hold" control line portion; said switching unit comprising a first plurality of fixed contacts connected to one audio line portion of each of said paris of line portions, a second plurality of fixed contacts connected to the other audio line portion of each of said pairs of line portions, a third plurality of fixed contacts connected to said "hold" control line portions, first movable contact means disposed adjacent said first plurality of fixed contacts for selecting a first circuit to be completed between the pairs of a selected one of said plurality of lines, second movable contact means ganged to said first movable contact means and disposed adjacent said second plurality of fixed contacts for selecting a second circuit to be completed between the pairs of a different selected one of said plurality of lines, third movable contact means ganged to said first and second movable contact means and disposed adjacent said third plurality of fixed contacts for selecting a third circuit to be completed between selected ones of said "hold" control line portions and said return line, manually operable switch means including switching elements in series with each of said first, second and third movable contact means for selectively completing each of said first, second and third circuits simultaneously, and bidirectional amplifier means for transferring amplified voice signals between said first and second circuits when said first and second circuits have been completed by said manually operable switch means.

2. The switching unit of claim 1 including relay means connected for energization upon completion of said first, second and third circuits, said relay means including switch contacts connected in parallel with the switching elements of said manually operable switch means for locking said first, second, and third circuits into their completed states.

3. The switching unit of claim 2 including battery means for energizing said amplifier means, said relay means including further switch contacts for completing a circuit between said battery means and said amplifier means for energizing said amplifier means upon energization of said relay means.

4. The switching unit of claim 1 wherein said first and second circuits include transformer means for transferring voice signals between said first and second circuits via said amplifier means.

5. The switching unit of claim 1 wherein different ones of said first plurality of fixed contacts are interconnected to one another, different ones of said second plurality of fixed contacts also being interconnected to one another, said interconnected pluralities of fixed contacts being so positioned relative to one another and relative to the different possible portions of said ganged movable contact means that each position of said ganged movable contact means selects a different combination of said plurality of lines to be connected to said first and second circuits for voice signal coupling to one another via said amplifier means.

6. A communication switching unit for use in a telephone system of the type employing a telephone set having a plurality of lines wherein each of said lines comprises a pair of audio line portions normally disconnected from one another, a "hold" control line portion associated with each of said pairs of audio line portions, and a return line normally disconnected from said "hold" control line portion; said switching unit comprising first switch means for selecting a first circuit to be completed between the pairs of a selected one of said plurality of lines, second switch means for selecting a second circuit to be completed between the pairs of a different selected one of said plurality of lines, third switch means for selecting a third circuit to be completed between selected ones of said "hold" control line portions and said return line, fourth switch means having switching elements in series with each of said first, second, and third switch means for selectively completing each of said first, second and third circuit simultaneously, and coupling means for transferring voice signals between said first and second circuits when said first and second circuits have been completed.

7. The unit of claim 6 including relays means responsive to the flow of line current in said first and second circuits for maintaining said first, second, and third circuits in their completed states, said relay means including contact means operative to open said completed circuits upon interruption of said line current flow.

8. The unit of claim 6 wherein said telephone system includes a multipin connector for connecting said plurality of lines to said telephone set, and further connector means adapted to separably engage said multipin connector for connecting said first, second, and third switch means in parallel with said plurality of lines.

9. The unit of claim 6 wherein said coupling means comprises amplifier means, and housing means for encasing said first, second, third and fourth switch means and said amplifier means in a single unit adapted for placement on a desk adjacent said telephone set.

10. The unit of claim 9 wherein said first, second and third switch means comprise rotary switches ganged to one another for simultaneous operation, rotatable operator means connected to said ganged rotary switches and accessible for operation on the exterior of said housing means, said fourth switch means comprising a manually operable toggle switch mounted in said housing means and including a two-position operator member accessible for operation on the exterior of said housing means.

11. In a telephone system employing a telephone set having a plurality of calling lines connected thereto, a communication switching unit disposed adjacent said telephone set and having switching means connected in parallel with said plurality of lines, said switching unit including bidirectional amplifier means having a pair of input/output circuits, said switching means comprising a first multiple position switch for connecting selected different ones of said plurality of lines to one of said amplifier input/output circuits, a second multiple position switch for connecting selected different ones of said plurality of lines to the other of said amplifier input/output circuits, and means interconnecting said first and second multiple position switches for synchronous operation wherein the selected line connected to one of said amplifier input/output circuits is always different from the selected line connected to the other of said amplifier input/output circuits.

12. The combination of claim 11 wherein said first multiple position switch includes interconnected switch contacts operative to connect the same line to one of said input/output circuits for each of a plurality of different first switch positions, said second multiple position switch including further switch contacts for connecting a succession of different lines to the other of said input/output circuits as said first switch is moved from one to the next of said plurality of different first switch positions.